(12) United States Patent
Choi

(10) Patent No.: US 6,762,586 B2
(45) Date of Patent: Jul. 13, 2004

(54) RECHARGEABLE SYSTEM FOR MOVABLE TOY

(75) Inventor: Kei Fung Choi, Hong Kong (CN)

(73) Assignee: Silverlit Toy Manufactory, Ltd., Hong Kong (CN)

( * ) Notice: Subject to any disclaimer, the term of this patent is extended or adjusted under 35 U.S.C. 154(b) by 0 days.

(21) Appl. No.: 10/290,935

(22) Filed: Nov. 7, 2002

(65) Prior Publication Data

US 2004/0090206 A1 May 13, 2004

(51) Int. Cl.⁷ ................................................. H02J 7/00
(52) U.S. Cl. .................... 320/107; 463/59; 446/454
(58) Field of Search .................. 320/107; 446/429, 446/275, 433, 435; 463/59, 62

(56) References Cited

U.S. PATENT DOCUMENTS

| | | | | |
|---|---|---|---|---|
| 3,970,309 A | * | 7/1976 | Sato | 463/59 |
| 4,056,764 A | * | 11/1977 | Endo | 320/101 |
| 4,697,133 A | * | 9/1987 | Pergandis | 320/107 |
| 5,767,655 A | * | 6/1998 | Ostendorff et al. | 320/107 |
| 6,565,410 B1 | * | 5/2003 | Allen | 446/454 |

* cited by examiner

Primary Examiner—Pia Tibbits
(74) Attorney, Agent, or Firm—Charles Berman, Esq.; Greenburg Traurig LLP

(57) ABSTRACT

A remote controlled toy vehicle with a rechargable battery operates with rechargeable system. A station has an outlet on or in adjacency with a surface on which the remotely controllable toy is movable, and electrical outlet contacts. The remote controlled toy has inlet contacts for electrically engaging the outlet contacts when steered to the station. When the toy is steered under remote control to the station and the outlet contacts and inlet contacts electrically engage, a rechargeable current is passible from the electrical outlet contacts to the electrical inlet contacts. The station is part of a bypass track and the toy vehicle is normally directed to travel on the track and bypass the station.

27 Claims, 2 Drawing Sheets

RECHARGEABLE SYSTEM FOR MOVABLE TOY

BACKGROUND OF THE INVENTION

This invention relates to a rechargeable system for toys. In particular it relates to a recharging system for toy vehicles.

Different systems are known for recharging toys. Invariably, this requires that the toy be placed in a recharger or that the rechargeable battery be removed from the toy and that the rechargeable battery be separately recharged and then replaced in the toy.

In known systems, some remote control cars are equipped with a rechargeable battery are recharged by putting the vehicle onto a charging base by hand. This causes a delay in the continuation of play in the overall toy system before play can again commence.

These different systems have disadvantages but the present invention is directed to overcoming these disadvantages.

SUMMARY OF THE INVENTION

A toy vehicle with a rechargeable battery operates with a rechargeable system. In particular the invention is concerned with the ability to direct a car under remote control operation to a recharged unit, and thereby permit a rechargeable battery in the car to be recharged.

A station for the recharger unit has an outlet on or in adjacency with a surface on which a toy is movable, and electrical outlet contacts. A toy has inlet contacts for electrically engaging the outlet contacts when steered to the station. When the toy is steered under remote control to the station and the outlet contacts and inlet contacts electrically engage, a rechargeable current is passible from the electrical outlet contacts to the electrical inlet contacts. The station is part of a bypass track and the toy vehicle is normally under remote control directed to travel on the track and bypass the station.

The rechargeable system for a movable toy comprises the station for location on a toy operating surface, for instance a floor, pavement, carpet, table or the like with the contacts. There is a suitable ramp or inlet for the toy to the station. The toy has suitable inlet contacts for electrically engaging the outlet contacts when steered to the station.

Steering the toy by a remote control device to engage the electrical outlet contacts is effected through wheels. The toy also has means for receiving at least one of an RF, programmable, voice, or IF controllable signal from a remote controller operable by a user of the toy. The remote controller can have a suitable transmitter for transmitting the signals.

The arrangement is such that when the toy is steered by remote control to the station and the outlet contacts and inlet contacts electrically engage, a rechargeable current is passible from the electrical outlet contacts to the electrical inlet contacts, thereby enabling recharging of the rechargeable battery.

The toy is preferably a 4-wheeled vehicle.

Preferably there are spaced inlet contacts longitudinally directed along at least a part of the length of a toy vehicle. The inlet contacts are located below a base for the toy vehicle. The outlet contacts are located on or along the longitudinal rail, the outlet contacts being directed longitudinally. The rail is for receiving a vehicle steered to the station with the rail being located longitudinally and substantially centrally between transverse wheels of the vehicle.

In a further preferred form of the invention there are biasing means relatively between the electrical outlet contacts and the electrical inlet contacts on the toy. As such the contacts are urged relatively towards each other thereby to facilitate effective contact with each other when in adjacency to each other.

Also in a preferred form of the invention there is a stop for stopping the toy movement when the toy is in a recharge mode and including means for deactivating the stop and permitting the toy to move from the station.

The station is preferably located as part of a track, and is located on a bypass to a normal track route. The toy vehicle is normally directed to travel on the track and bypass the station. Steering of the vehicle to the bypass permits the vehicle to be received at the station.

The toy vehicle preferably includes at least one gearbox for operating at least one motive means on the toy. The motive means includes a wheel for driving the vehicle into and from the station.

There can be means to permit multiple vehicles, preferably serially, to enter the station. When a second vehicle enters the station for recharging a first vehicle is urged to exit the station.

The invention is further described with reference to the accompanying drawings.

DETAILED DESCRIPTION OF THE INVENTION

Figure 1:
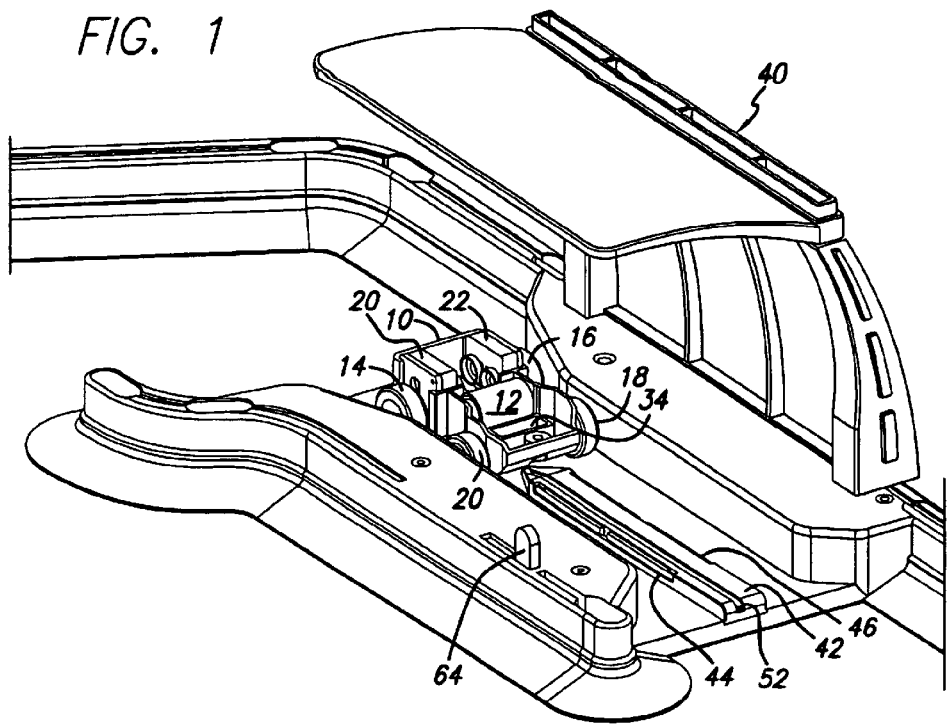
FIG. 1 is a perspective view of a toy vehicle in a rechargeable station, the vehicle being shown in a position about to enter the area for recharging.

The invention allows the user to drive the car onto the charging station for power charging. There can be 2 or more cars in a set that allow the player to drive one car onto the charging station for power charging and to continue to play with the other car during the recharge period of the first car.

A rechargeable system for a movable toy vehicle comprises a station having electrical outlet contacts, and means for providing recharging power through the outlets. A toy vehicle has inlet contacts for electrically engaging the outlet contacts when steered to the station and thereby receive the recharging power. The toy vehicle is steerable under remote control through a transmitter receiver system to engage the electrical outlet contacts. A rechargeable battery with the remote controlled toy vehicle powers motive means to move the toy.

The invention employs a remotely controllable car, selectively in infrared control, radio frequency control, programmable control or voice recognition control, equipped with a rechargeable battery that can be recharged by a charging station or track. A rechargeable track station contains electronic circuit and a battery or connection with an electrical mains source to generate power.

A vehicle 10 is powered by a rechargeable battery 12. There are four wheels, 14, 16, 18 and 20, respectively. The wheels 14 and 16 are powered respectively by a motive means which includes a motor and gear box configuration, 20 and 22, respectively. A rechargeable battery supplies the appropriate power for those motive means which turn the wheels 14 and 16 as may be required.

Mounted below the base or chassis 24 for the vehicle are two respective contact plates, 26 and 28, which extend longitudinally under the vehicle from a position towards the front and a position towards the back. Each of these electrical inlet contacts 26 and 28 is respectively spring mounted in a housing 30 and 32 which is mounted underneath the chassis base 24. As such, the spring inlet contacts 26 and 28 are biased towards a central position running longitudinally through the vehicle.

Figure 3:
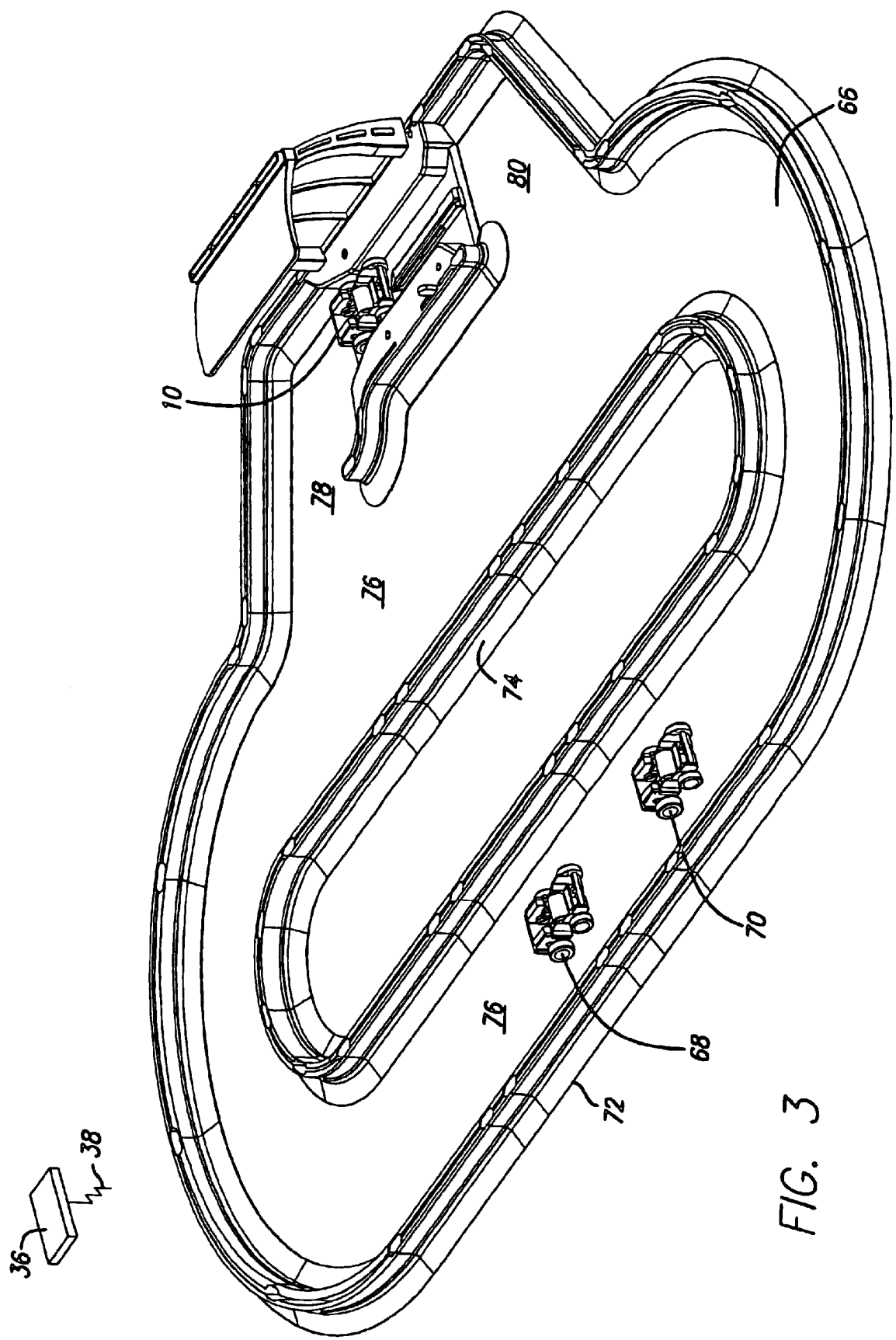
FIG. 3 is a perspective view of a track showing the recharge station in one place and the vehicle about to enter the recharge station and two other vehicles diagrammatically shown on the track.

The vehicle also includes a housing 34 for receiving control signals from an infrared radio frequency or programmable voice control unit 36 which is shown figuratively in FIG. 3 and signals 38 with the receiver 34 on the vehicle. These systems are disclosed in further detail in U.S. Pat. No. 6,390,883 and pending application Ser. No. 10/279,534 entitled Toy with Programmable Remote Control filed Oct. 23, 2002 by the present Applicant). The contents of this patent and the application are incorporated by reference herein.

Remote control 36 has the ability to steer the vehicle 10 as required and cause different programmable actions such as variations in speed and direction as necessary. As such, the vehicle can go forwardly or reverse as the case may be.

Figure 2:
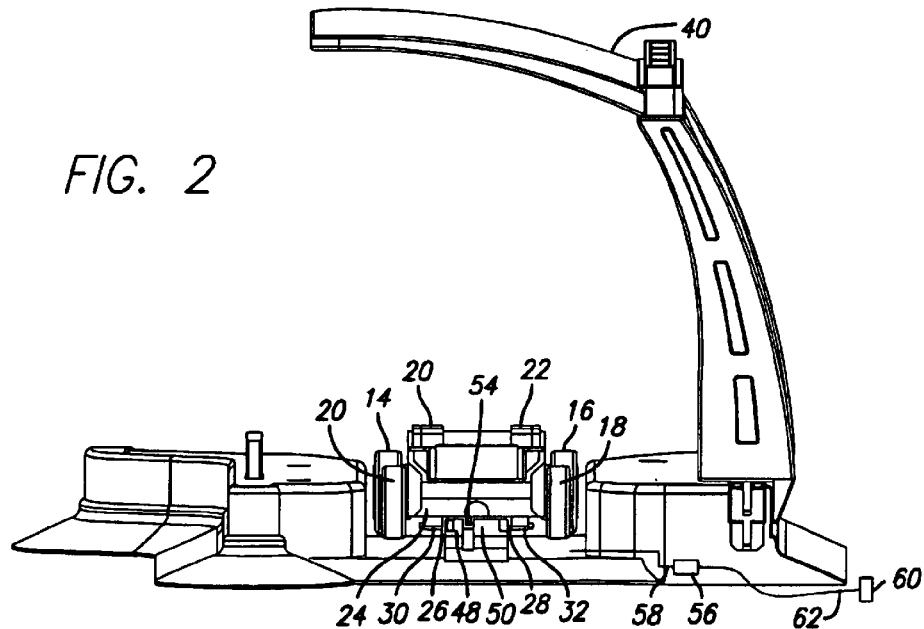
FIG. 2 is a front view of the vehicle in the recharge station with the electric contacts making contact with the contacts in the recharge station.

The vehicle 10 is shown in FIGS. 1, 2 and 3 as shown in close relationship or on a rechargeable station. The rechargeable station 40 is a longitudinally extended rail 42 and to either side of the rail to longitudinal electrical outlet contacts 44 and 46, respectively. These electrical contacts 44 and 46 can also be physically mounted in their respective housings 48 and 50 so as to be biased outwardly from the central rail 42. In this manner, when a vehicle 10 is in location on the rail the respective outlet contacts 44 and 46 are biased outwardly and the vehicle contacts 28 and 30 are biased inwardly. This would insure a good positive contact between these elements to ensure that good electrical continuity is achieved.

Also, to facilitate the steering of the vehicle 10 into a position on the rail there is provided a slotted rail 32 which is longitudinally directed in the main rail 42 and this engages a longitudinal slot 54 in the base of the vehicle. This facilitates correct and positive alignment of the vehicle so that the contacts are in a good relationship.

When there is a positive touching connection between the respective contact plates, provided from a recharged circuit figuratively shown as 56 in the recharge station 40 can be applied through conductors 58, the power for the rechargeable circuit being obtained from main supply 60 through the conductor 62.

The recharge station also has a physical switch bar 64 on a side adjacent to the station. Operation of that bar manually by a user can cause the vehicle 10 to be removed manually from the station or expelled from the station, as the case may be.

The invention can be operable in a defined track 66 and more than one vehicle 10 can be provided. The track 66 is shown in FIG. 3 with additional vehicle 68 and 70 in the track. The track is formed between guard rails 72 and an internal guard rail 74. One half of the track 76 has a by pass which is a divert to and from the station as indicated through zones 78 and 80. Between the zones 78 and 80 there is a located the rechargeable station 40.

There are many alternative configurations. There can be a situation with a rechargeable station located on the ground and the system can operate without a defined track 76.

The invention is directed to a system which includes a rechargeable station which receives vehicles movable on a surface. In some situations the vehicles may be other than a 4 wheel car. For instance, a 2-wheel or 3-wheel vehicle may be usable with or without a the track. In other situations different kinds of vehicles other than a car may be used.

Although ideally wheels would be appropriate to move the vehicle on the surface, there can be situations where the mode of means are not wheels but other devices, for instance traction devices, to cause the vehicle or toy to move on the surface.

The one or two or more cars in the set have an electronic circuit which act as a device to detect the power generated by a rechargeable track or base station through different methods like: metal contacts, magnetic field or light activated.

The one or two or more cars in the set operate on the same radio frequency channel and with a circuit to detect power charging status. Once a car #1 has been driven onto the charging station, it is locked and does not accept any control frequency. Only a car #2 car can then be driven on the road. When car #2 needs to have a charge of its battery, the player drives it onto the charging station and bumps car #1 out of the charging station. Then car #2 car is locked and the player can drive the car #1.

During charging, the remote system of the car can still be enabled and a user may drive the car away and stop charging at desired.

The invention is also directed to a vehicle having the recharge capabilities and the recharge terminals located in a manner for use as indicated with the recharge station. A track may or may not be used with the system.

The interaction of the recharge station with the vehicle in a manner so as not to require physical or manual lifting of the vehicle and placing that in the recharge station, but rather the ability of the vehicle to be driven or steered to that station as part of or as an aside to its normal operating condition is a significant advantage of the present invention. In addition there is the ability to continue play with one or more other cars during recharge of car at the recharge station.

Many other forms of the invention exist, each different from others in matters of detail only. The invention is to be determined by the scope of the following claims.

I claim:

1. A rechargeable system for a movable toy comprising:
   a) a station having electrical station contacts for receiving a movable toy;
   b) a toy having electrical toy contacts for electrically longitudinally engaging the station contacts when steered to the station;
   c) a mechanism for steering the toy to engage the station contacts;
   d) a rechargeable battery with the toy for powering motive means with the toy to move the toy;
   e) a receiver with the toy for receiving a programming signal to effect operation of the steering mechanism such that the toy is steerable by remote control;
   f) a transmitter for sending a programmable signal to the receiver; and g) the toy being steerable under remote control to the station by signals from the transmitter to the receiver whereby the station contacts and toy contacts electrically engage along side portions of the station contacts and the toy contacts by way of a longitudinal movement of the toy contacts with respect to the station contacts, and a rechargeable current is passible from the station contacts to the toy contacts, thereby enabling recharging of the rechargeable battery.

2. A rechargeable system for a movable toy comprising:
   a) a station having outlet on or in adjacency with a surface on which a movable toy is movable, the station having an electrical station contacts;
   b) a toy having electrical toy contacts for electrically longitudinally engaging the station contacts when steered to the station;
   c) a mechanism for steering the toy to engage the station contacts;
   d) a rechargeable battery with the toy for powering motive means with the toy to move the toy on the surface; and
   e) the arrangement being such that when the toy is steered to the station, the station contacts and the toy contacts electrically engage along side portions of the station contacts and the toy contacts by way of a longitudinal movement of the toy contacts with respect to the station contacts, and a rechargeable current is passible from the station contacts to the toy contacts, thereby enabling recharging of the rechargeable battery.

3. A rechargeable system as claimed in either claim 1 or claim 2, wherein steering of the toy includes means for receiving at least one of an RF, programmable, voice, or IF controllable signal from a remote controller operable by a user of the toy.

4. A chargeable system as claimed in either claim 1 or claim 2 wherein the toy is a wheeled vehicle.

5. A rechargeable system as claimed in claim 4 wherein the wheeled vehicle is a 4-wheeled vehicle.

6. A rechargeable system as claimed in either claim 1 or claim 2 wherein there are spaced toy contacts longitudinally directed along at least a part of the length of a toy vehicle, and wherein the toy contacts are located below a base for the toy vehicle.

7. A rechargeable system as claimed in either claim 1 or claim 2 wherein the station contacts an located on or along the longitudinal rail, the station contacts being directed longitudinally, and the rail being for receiving a vehicle steered to the station with the rail being located longitudinally and substantially centrally between transverse wheels of the vehicle.

8. A rechargeable system as claimed in either claim 1 or claim 2 including biasing means relatively between the electrical station contacts and the electrical toy contacts on the toy such that the contacts are urged relatively towards each other thereby to facilitate effective contact with each other when in adjacency to each other.

9. A rechargeable system as claimed in either claim 1 or claim 2 including a stop for stopping the toy movement when the toy is in a recharge mode and including means for deactivating the stop and permitting the toy to move from the station.

10. A rechargeable system as claimed in either claim 1 or claim 2 wherein the station is located as part of a track, and is located on a bypass to a normal track route, and the toy is a vehicle normally directed to travel on the track and bypass the station, and wherein the steering of the vehicle to the bypass permits the vehicle to be received at the station.

11. A rechargeable system as claimed in either claim 1 or claim 2 wherein the toy is a vehicle including at least one gearbox for operating at least one motive means on the toy, the motive means including a wheel for driving the vehicle into and from the station.

12. A rechargeable system as claimed in either claim 1 or claim 2 including means to permit multiple vehicles, preferably serially, to enter the station, and wherein when a second vehicle enters the station for recharging a first vehicle is urged to exit the station.

13. A rechargeable system for a movable toy vehicle comprising:
   a) a station having electrical station contacts, and means for providing recharging power through the outlets;
   b) a toy vehicle having toy contacts for electrically longitudinally engaging the station contacts when steered to the station and thereby to receive the recharging power;
   c) the toy vehicle being steerable under remote control through a transmitter receiver system thereby to engage the station contacts along side portions of the station contacts and the toy contacts by way of a longitudinal movement of the toy contacts with respect to the station contacts; and
   d) a rechargeable battery with the toy vehicle for powering motive means to move the toy.

14. A rechargeable system for a movable toy vehicle comprising:
   a) a station having an outlet on or in adjacency with a surface on which a movable toy vehicle is movable, the station having electrical station contacts located on or along a longitudinal rail;
   b) a toy vehicle having toy contacts for electrically longitudinally engaging the station contacts when steered to the station;
   c) a mechanism for steering the toy vehicle to engage the station contacts;
   d) a rechargeable battery with the toy vehicle for powering motive means with the toy to move the toy on the surface;
   e) spaced toy contacts longitudinally directed along at least a part of the length of a toy vehicle, and wherein the toy contacts are located below a base for the toy vehicle; and
   f) the station contacts being directed longitudinally, and the rail being for receiving the toy vehicle when steered to the station with the rail being located longitudinally and substantially centrally between transverse wheels of the vehicle.

15. A rechargeable system as claimed in either claim 13 or 14 wherein steering of the toy includes means for receiving at least one of an RF, programmable, voice, or IF controllable signal from a remote controller operable by a user of the toy.

16. A rechargeable system as claimed in either claim 13 or 14 wherein the toy is a 4-wheeled vehicle, and wherein the toy vehicle includes at least one gearbox for operating at least on motive means on the toy, and the motive means includes a wheel for driving the vehicle into and from the station.

17. A rechargeable system as claimed in either claim 13 or 14 including biasing means relatively between the station contacts and the toy contacts on the toy such that the contacts are urged relatively towards each other thereby to facilitate effective contact with each other when in adjacency to each other.

18. A rechargeable system as claimed in either claim 13 or 14 wherein the station is located as part of a track and the toy vehicle is normally directed to travel on the track and bypass the station, and wherein the steering of the vehicle to the bypass permits the vehicle to be received at the station.

19. A toy with a rechargeable battery for operating with rechargeable system for the toy vehicle comprising:
   a) a station having an outlet on or in adjacency with a surface on which a toy is movable, the station having electrical station contacts;
   b) a toy having electrical toy contacts for electrically longitudinally engaging the station contacts when steered to the station;
   c) a mechanism for steering the toy to engage the electrical station contacts; and
   d) the arrangement being such that when the toy is steered to the station and the station contacts and toy contacts electrically engage along side portions of the station contacts and the toy contacts by way of a longitudinal movement of the toy contacts with respect to the station contacts, a rechargeable current is passible from the station contacts to the toy contacts, thereby enabling recharging of the rechargeable battery.

20. A toy vehicle and rechargeable system as claimed in claim 19 wherein steering of the toy vehicle includes means for receiving at least one of and RF, programmable, voice, or IF controllable signal from a remote controller operable by a user of the toy.

21. A rechargeable system as claimed in claim 19 wherein the toy is a 4-wheeled vehicle, and wherein the toy vehicle includes at least one gearbox for operating at least one motive means on the toy, and the motive means includes a wheel for driving the vehicle into and from the station.

22. A rechargeable system as claimed in claim 19 wherein the station is located as part of a track, and is located on a bypass to a normal track route, and the toy vehicle is normally directed to travel on the track and bypass the station, and wherein the steering of the vehicle to the bypass permits the vehicle to be received at the station wherein steering of the toy includes means for receiving at least one of an RF, programmable, voice, or IF controllable signal from a remote controller operable by a user of the toy.

23. A toy vehicle with a rechargeable battery for operating with rechargeable system for the toy vehicle comprising:
   a) a station having an outlet on or in adjacency with a surface on which a toy is movable, the station having an electrical station contacts;
   b) a toy having electrical toy contacts for electrically longitudinally engaging the station contacts when steered to the station;
   c) a mechanism for steering the toy to engage the electrical station contacts;
   d) the arrangement being such that when the toy is steered to the station, the station contacts and toy contacts electrically engage along side portions of the station contacts and the toy contacts by way of a longitudinal movement of the toy contacts with respect to the station contacts, and a rechargeable current is passible form the station contacts to the toy contacts, thereby enabling recharging of the rechargeable battery;
   e) the station being part of a track and the toy vehicle normally being directed to travel on the tract and bypass the station, and wherein the steering of the vehicle to a bypass in the track permits the vehicle to be received at the station.

24. A recharge station for use in combination with a toy vehicle track and a toy vehicle to be recharged, the toy vehicle having toy electrical contacts substantially longitudinally disposed along at least a portion of the toy vehicle, the recharge station having station electrical contacts substantially longitudinally disposed along at least a portion of the recharge station, the station electrical contacts being engageable with the toy electrical contacts along a plurality of lateral engaging positions between the toy electrical contacts and the station electrical contacts by way of a longitudinal movement of the toy electrical contacts with respect to the station electrical contacts.

25. In a recharge station for use in combination with a toy vehicle track and a toy vehicle to be recharged, the toy vehicle having toy electrical contacts, the recharge station having station electrical contacts, the station electrical contacts engageable with the toy electrical contacts, the improvement comprising, in combination:
   a) substantially longitudinally disposing the toy electrical contacts along at least a portion of the toy vehicle, the toy electrical contacts having toy electrical contacts side portions; and
   b) substantially longitudinally disposing the station electrical contacts along at least a portion of the recharge station, the station electrical contacts having station electrical contacts side portions,
   whereby engagement between the toy electrical contacts and the station electrical contacts occurs along the toy electrical contacts side portions and the station electrical contact side portions by way of a longitudinal movement of the toy electrical contacts with respect to the station electrical contacts.

26. In the recharge station of claim 25, the improvement further comprising remotely controlling the longitudinal movement of the toy electrical contacts.

27. A rechargeable system for a movable toy vehicle to be recharged, the rechargeable system comprising:
   a recharge station having station electrical contacts substantially longitudinally disposed along at least a portion of the recharge station; and
   a toy vehicle having toy electrical contacts substantially longitudinally disposed along at least a portion of the toy vehicle,
   the station electrical contacts being engageable with the toy electrical contacts along different lateral engaging positions between the toy electrical contacts and the station electrical contacts by way of a longitudinal movement of the toy electrical contacts with respect to the station electrical contacts.

* * * * *